(12) United States Patent
Wick et al.

(10) Patent No.: US 6,871,687 B2
(45) Date of Patent: Mar. 29, 2005

(54) AUTOMATED CORE PACKAGE PLACEMENT

(75) Inventors: Gary L. Wick, Wind Lake, WI (US); Douglas K. Linn, Waukesha, WI (US); William A. Crusan, Waukesha, WI (US); Jeffrey J. Chopp, Salem, WI (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 174 days.

(21) Appl. No.: 10/422,235

(22) Filed: Apr. 24, 2003

(65) Prior Publication Data

US 2004/0211543 A1 Oct. 28, 2004

(51) Int. Cl.[7] .............................................. B22D 33/04
(52) U.S. Cl. ........................ 164/4.1; 164/137; 164/340
(58) Field of Search ...................... 164/4.1, 137, 340

(56) References Cited

U.S. PATENT DOCUMENTS

| | | | | |
|---|---|---|---|---|
| 4,620,353 A | * | 11/1986 | Pryor | 164/4.1 |
| 5,954,114 A | * | 9/1999 | Bauer et al. | 164/137 |
| 6,505,678 B2 | * | 1/2003 | Mertins | 164/516 |

* cited by examiner

*Primary Examiner*—Kuang Y. Lin
(74) *Attorney, Agent, or Firm*—Susan L. Lukasik; Dennis Kelly Sullivan; Jeffrey P. Calfa

(57) ABSTRACT

A method of automatically placing a core package (301) in a mold (505) is provided. Locators (501) and a cavity (503) designed to receive at least a part of the core package (301) are formed in the mold (505). The mold (505) is positioned such that the locators (501) may be illuminated and one or more images are obtained of the locators (501). The images are processed to determine a target location for the core package (301) in the cavity (503), and an automated device (303) places the core package (303) in the mold (505) at the target location.

22 Claims, 4 Drawing Sheets

AUTOMATED CORE PACKAGE PLACEMENT

FIELD OF THE INVENTION

This invention relates to automated manufacturing, including but not limited to automated placement of core packages into molds for use in producing iron castings.

BACKGROUND OF THE INVENTION

Manufacture of iron castings and other metal castings is known to include inserting a casting core into a mold and pouring molten metal into the mold. Known methods of automatically placing the core into the mold with an automated device via a mechanical alignment process typically include placing the mold in a flask in a known, fixed location, and utilizing pins and bushings mechanically align the core with the mold prior to insertion. Such mechanical alignment processes fail when the pins do not have a fixed orientation with respect to the mold or the image disposed in the mold.

Casting cores today may be very heavy, depending on their application. For example, casting cores utilized to make cast iron components in the automotive industry may weight over 100 pounds or 50 kilograms. At times, the tolerance between the core and the mold is as small as 0.010 inches. When a core is heavy and tolerances are tight, manual placement in an efficient manner without damaging the mold is very difficult if not impossible.

Accordingly, there is a need for an automated method of setting cores in a mold, which method accommodates for pin-mold orientation, tight tolerances, and core weight.

SUMMARY OF THE INVENTION

An automated device lifts a core package capable of at least partially fitting into a cavity in a mold. At least one area of the mold is illuminated where one or more locators are expected to be located. At least one image is obtained of the at least one area of the mold. At least one differential location of at least one of the one or more locators is determined from the at least one image with respect to a reference image. A target location for the cavity is determined from the at least one differential location. The core package is placed by the automated device at the target location.

DESCRIPTION OF A PREFERRED EMBODIMENT

The following describes an apparatus for and method of automatically placing a core package in a mold. Locators and a cavity designed to receive at least a part of the core package are formed in the mold. The mold is positioned such that the locators may be illuminated and one or more images are obtained of the locators. The images are processed to determine a target location for the core package in the cavity, and an automated device places the core package in the mold at the target location.

Figures 1, 2:
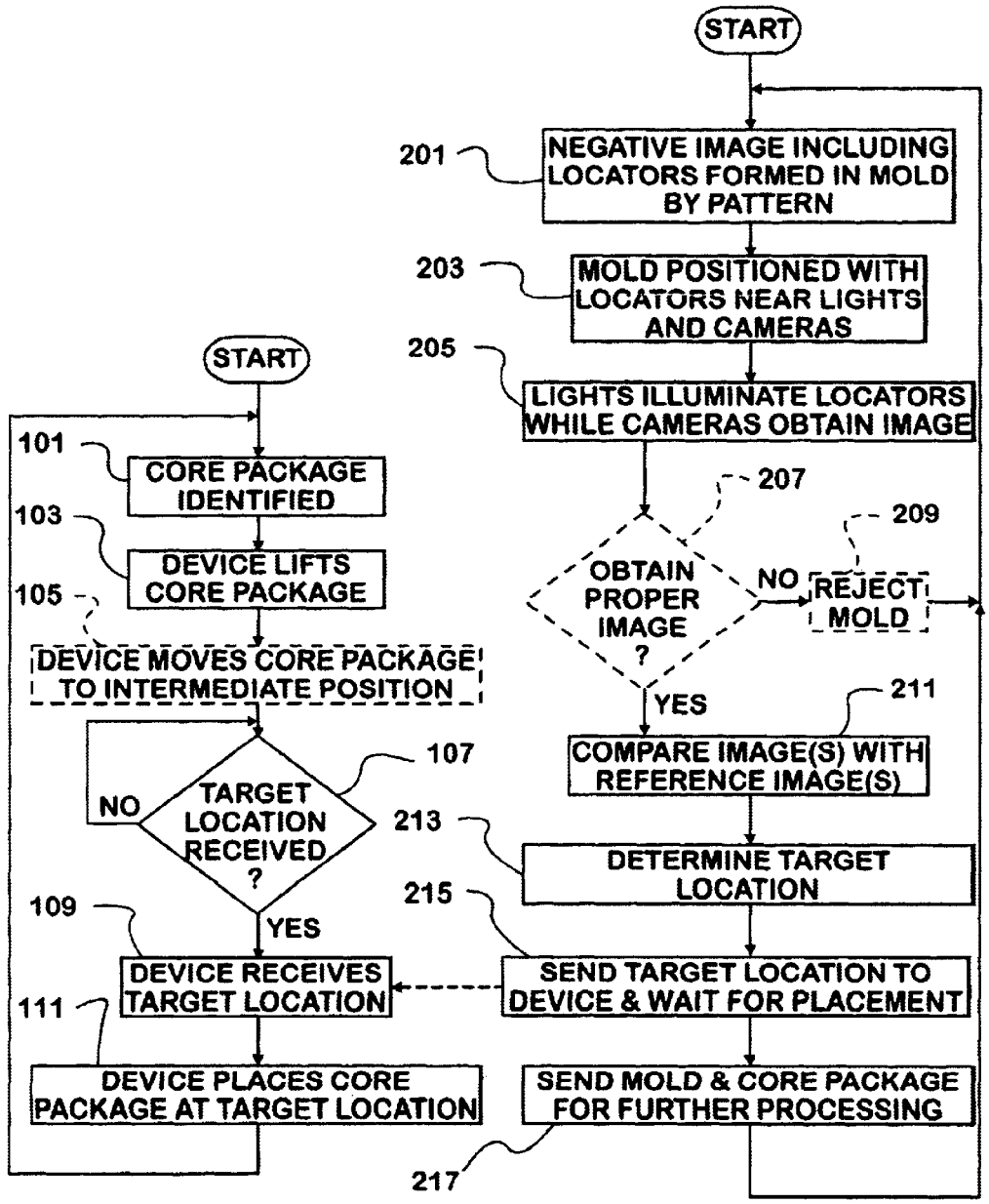
FIG. 1 is a flowchart showing an automated method of core placement by an automated device in accordance with the invention.
FIG. 2 is a flowchart showing an automated method of determining a location for core placement by an automated device in accordance with the invention.

Flowcharts showing processes utilized to automatically place a core package in a mold are shown in FIG. 1 and FIG. 2. The processes shown in the flowcharts are performed by one or more computers, such as a Sercos Digital Drive Controller Model DKCO2.3-100-7-FW available from Indramat, that interoperate to synchronize the steps such that they are performed in an efficient manner.

Figure 3:
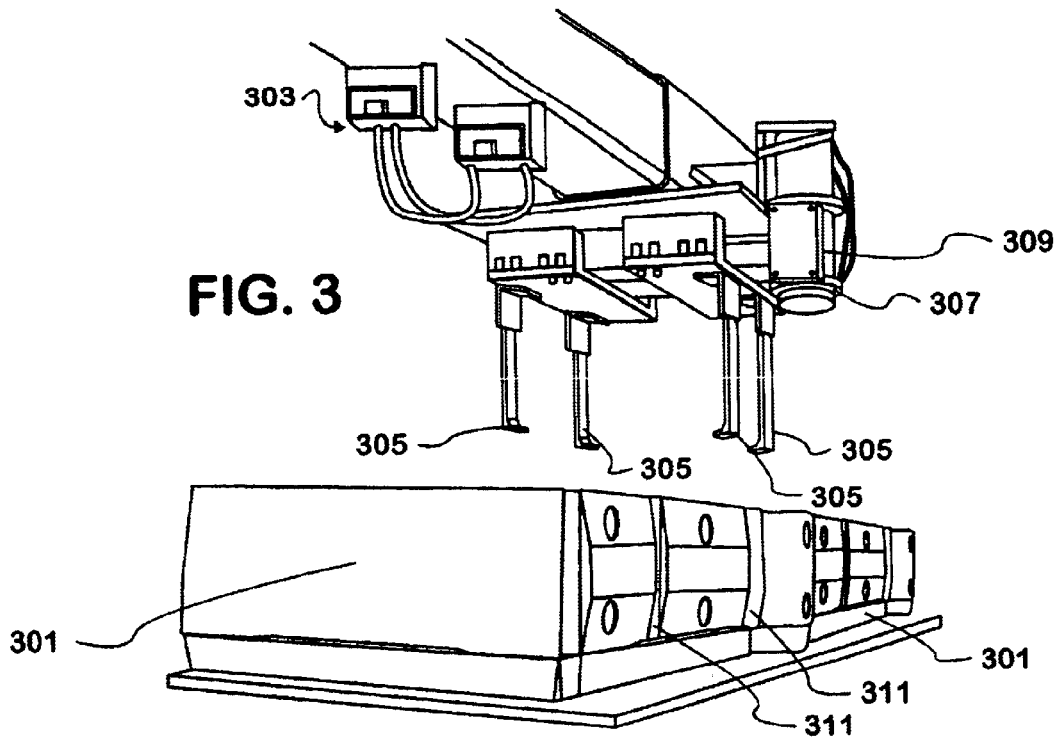
FIG. 3 is a diagram illustrating core packages in relation to an automated device in accordance with the invention.

At step 101, a core package 301 is identified for placement (see FIG. 3). The core package may be comprised of one or more pieces. An automated device 303, which may comprise one or more components, such as a Gantry Robot Model Titan II H-2P-4X with a Lifting Device Model 7003-M600 available from Electronic Controls & Systems, Inc., provides various automated capabilities including, for example, the ability to move horizontally and vertically to designated locations, to pick up and/or lift objects, such as core packages 301, to move objects from one location and place them in another location, to release the objects 301, to illuminate the objects 301, and to obtain images of the objects 301. The automated device 303 includes four arms 305 that have fingers on the lower ends of the arms 305. The arms 305 are capable of expanding to surround an outer periphery of an object 301, and the fingers are capable of being slid under the object 301, such that when the arms 305 compress against the object 301, the automated device 303 is capable of securely lifting and moving the object 301.

A light 307, which is advantageously an infrared light, such as an Insight™ Infrared Ring Light 90 mm Direct 12/V 9W model CLM-LDR90B-00 available from Cognex Corporation, illuminates the core package 301 while a camera 309, such as an Insight™ Model 1000 Vision Sensor #ISS-1000-00 with a model 115-0050 55 mm telecentric lens available from Cognex Corporation, takes an image of the core package 301. The image of the core package 301 is utilized to determine the actual location and rotation factor of the core package 301 and to instruct the arms 305 to lift the core package 301 at step 103. The core package 301 may advantageously include slots 311 in its outer periphery to assist the arms 305 in gripping the core package 301 at a predetermined place. When the arms 305 compress against the core package 301, the arms 305 fit in the slots 311 and prevent the core package 301 from sliding with respect to the arms 305. Although only two slots 311 are shown in FIG. 3, one slot 311 is provided for each arm 305 of the automated device. The core package 301 may be rejected if it does not meet sufficient parameters expected in the image of the core package 301. At step 105, the automated device 303 may optionally move the core package 301 to an intermediate position. The intermediate position is advantageously closer to a location near where the core package 301 is expected to be placed, such that placement of each core package 301 is more time efficient. The automated device 303 holds the core package 301 in place at step 107 while it waits to receive a target location where the core package will be placed.

Figure 4:
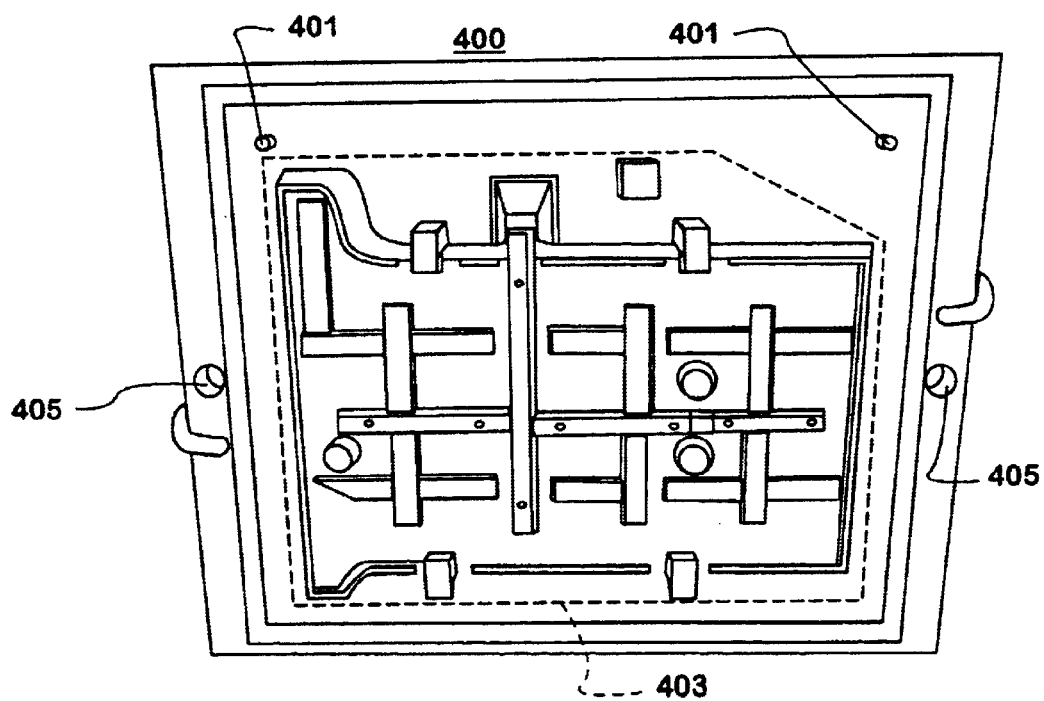
FIG. 4 is a view of a pattern utilized to form a mold in accordance with the invention.
Figure 5:
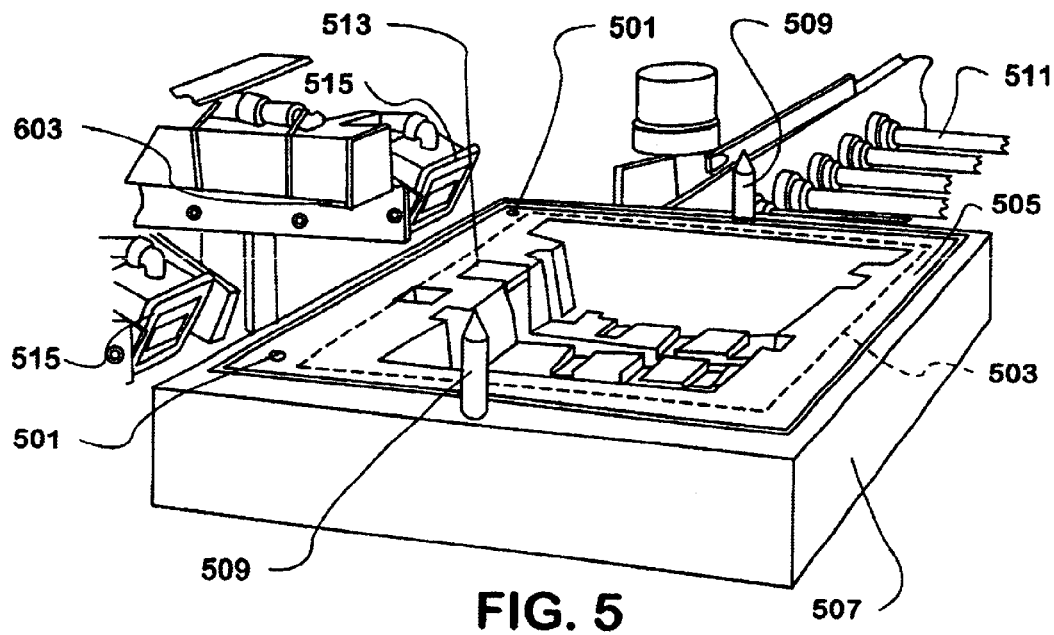
FIG. 5 is a perspective view of a mold disposed in a flask in accordance with the invention.

At step 201, a pattern 400, such as shown in FIG. 4, forms a negative image including one or more locators 501 and a cavity 503 in a mold 505, such as shown in FIG. 5. The pattern 400 is a positive image that is pressed into a bed of sand to form the negative image in the mold 505. The sand is referred to as green sand, which is typically black in color and is readily available in the industry. The pattern includes an inverted version 401 of the locators 501 that are formed in the mold 505 advantageously along one side of the mold 505. The locators 501 may be recesses or slots formed in the mold 505 as shown in FIG. 5. The locators 501 may alternatively be formed as bumps or bulges that extend outwardly from the mold 505. The pattern 400 also includes an inverted version 403 of the cavity 503 that is formed in the mold. The locators 501 are advantageously positioned outside the cavity in an unused area of the mold 505, thereby providing a better environment for utilizing imaging techniques to identify the locators 501. The locators 501 may alternatively be positioned within the cavity 503 and may be a feature that is inherently part of the cavity 503.

The mold 505 is formed in a flask 507 to maintain integrity of the mold 505 and to easily move the mold 505 throughout the manufacturing process, e.g., via a conveyor system 511. Alignment of various devices to the flask 507 is provided by flask pins 509 disposed in the flask 507 outside the mold 505. The pattern 400 mechanically aligns to the flask 507 by flask holes 405 disposed in the pattern 400. Because the flask holes 405 and flask pins 509 have a larger tolerance, e.g., on the order of 0.3 inches, than the tolerance that the mold 505 has with respect to the core package 301, e.g., 0.010 inches, the pattern 400 floats over a region on the flask 507, such that the relative position of the mold 505 to the flask 507 varies. Thus, one cannot place the core package 301 in a fixed position with respect to the flask 507 without damaging the mold. Mechanical alignment is also impractical to align the mold 505 and core package 301 without damaging the mold at a high rate of production, such as 100 or more molds/hour.

Typical core package and mold arrangements utilize a two-piece mold that includes a lower part known as a drag, which part of the mold 505 is shown in FIG. 5, and an upper part known as a cope (not shown). The drag will be referred to as the mold for the sake of simplicity herein.

Optional steps may be performed once the mold 505 is formed. For example, a filter 513 may be inserted into the mold 505 when molten metal enters the mold. The mold 505 may be manually or automatically inspected for defects, and may be rejected from further processing. Additives for the molten metal may be added to the mold.

Figure 6:
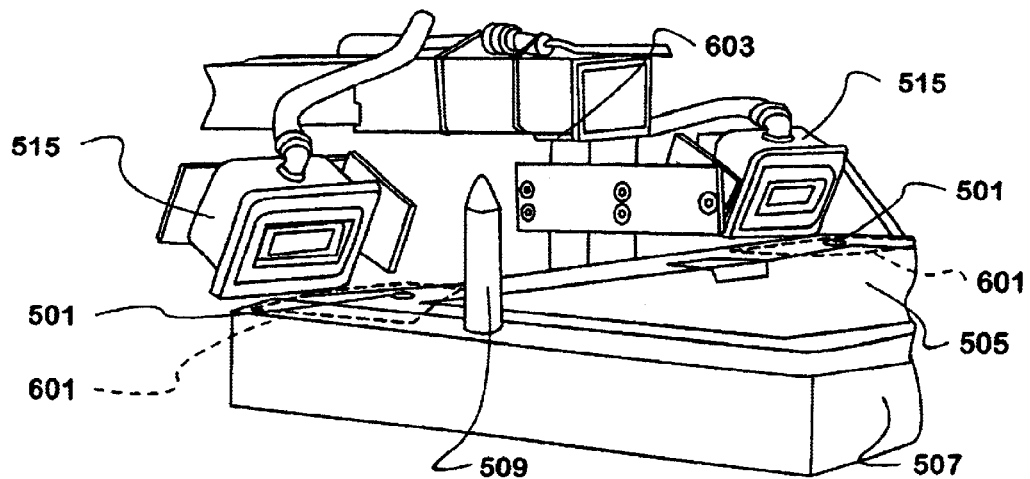
FIG. 6 is a perspective view of a lighting and camera system for use with a mold in accordance with the invention.
Figure 7:
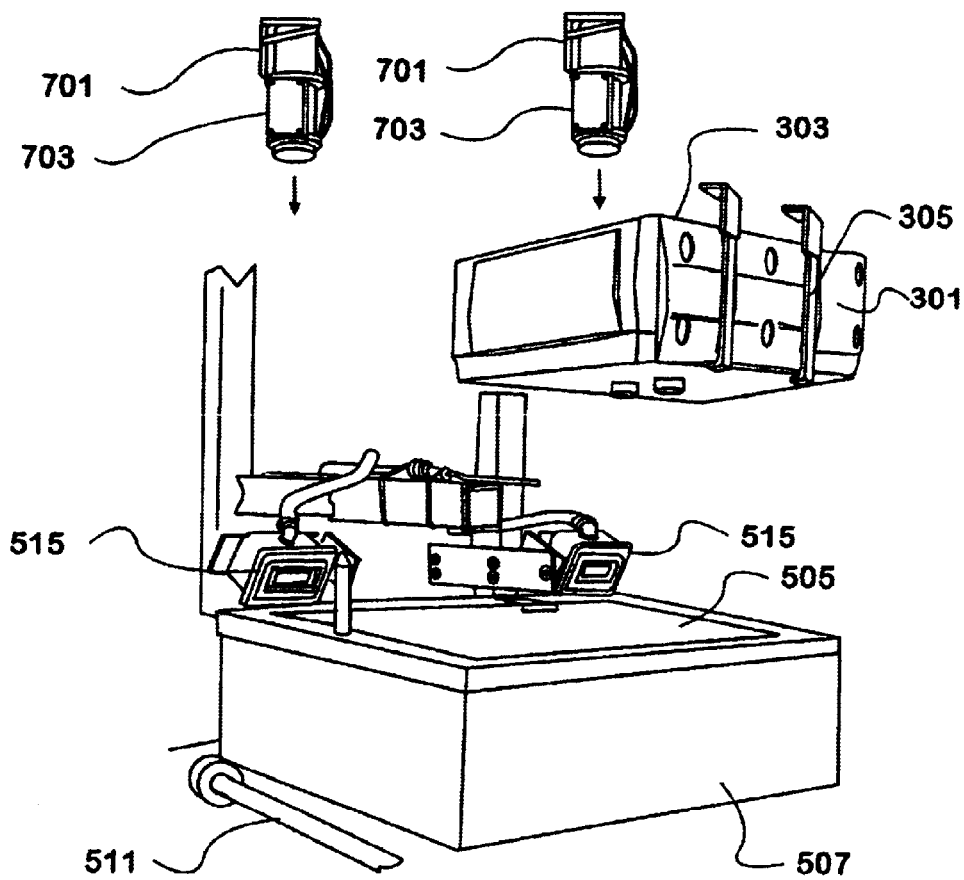
FIG. 7 is a perspective view of an automated device in the process of placing a core package into a mold in accordance with the invention.

At step 203, the mold 505 is positioned with each of the locators 501 near a respective light 515 that works in conjunction with a camera 701 positioned over an expected location of each locator 501 as shown in FIG. 5, FIG. 6, and FIG. 7. The light 515 may include infrared LEDs (Light Emitting Diodes) or other sources of light, and may be, for example, an Insight™ Bar Light Direct 12/V 4.5W model CLM-LDL74X27N-00 available from Cognex Corporation. Each camera 701 is capable of obtaining images under the type of light provided by the lights 515. When infrared light is sourced by the lights 515, the camera 701 may be, for example, an Insight™ Model 1000 Vision Sensor model ISS-1000-00 camera and the lens 703 may be a model 114-004 lens available from Cognex Corporation. Although it is advantageous to utilized infrared light, other types of lighting and cameras may be utilized. At step 205, the lights illuminate the locators 501 while each camera 701 (see FIG. 7) obtains one or more images of the areas 601 where the locators 501 are expected to be found, as shown in FIG. 6. Optionally, during step 205, an optional laser ranging device 603, such as an ILD 200 Laser Optical Displacement Sensor model 4120030 available from Micro-Epsilon America LP, obtains a distance to the mold 505. The cameras 701 are disposed approximately 5 to 6 feet above the mold 505 when it is disposed near the lights 515, with each lens 703 directed downward toward one of the locators 501. The cameras 701 are fixed in place.

At optional step 207, if one or more images obtained at step 205 or not proper, e.g., the locators 501 are not within the limitations set forth for a proper locator 501, the mold 505 is rejected at step 209 and the process continues with step 201. If a proper image is obtained at step 205, the process continues with step 211. If steps 207 and 209 are not utilized, the process moves from step 205 directly to step 211.

At step 211, one or more of the images obtained at step 205 are compared with one or more reference images. The reference image may include, for example, an image of a locator 501 on the mold 505, including an expected position for the locator 501 with respect to a reference point, such as provided in a calibration performed by the cameras 701. The locators 501 have a circular shape in the x-y plane for the sake of simplicity, although the locator may take on a wide variety of shapes. A differential location may be determined for each locator 501. The differential location describes how far in each direction the locator 501 is from the its expected position on the reference image.

At step 213, a target location, including u, x, y, and/or z components, is determined for the placement of the core package 301. The target location is determined from at least one or more of the differential locations. The target location may be given in absolute terms with respect to a universal set of coordinates or may be given in differential terms with respect to the reference image, i.e., how much the core package 301 needs to be moved from a reference point in each direction in order to be properly placed in the mold 505. The x-direction and y-direction components of the target location are provided by comparison of the image obtained by the cameras 701 as compared to one or more reference images. The target location may include a z-direction component as provided by the distance measurement taken by the optional laser ranging device 603 and comparing the measured distance to an expected distance to the mold 505. Advantageously, utilization of the differential locations for each of the locators 501 provides a rotational ("u-direction") component for the target location in addition to an x-direction component and a y-direction component. The rotational component defines an angle by which the cavity is rotated with respect to an expected rotational position. If, for example one locator 501 is displaced by 0.002 inches in the x-direction and 0.004 inches in the y-direction, and the other locator 501 has the same displacements in each direction, there is no rotational component. If in the same example, the other locator 501 is displaced by −0.002 inches in the x-direction and −0.004 inches in the y-direction, there is a rotational component, that may be expressed in degrees or radians. Because the relative positive of the locators 501 with respect to each point on the cavity 503 is known, the target location may be defined with respect to any reference point on the cavity. Steps 101 through 107 may take place while steps 201 through 213 take place.

Figure 8:
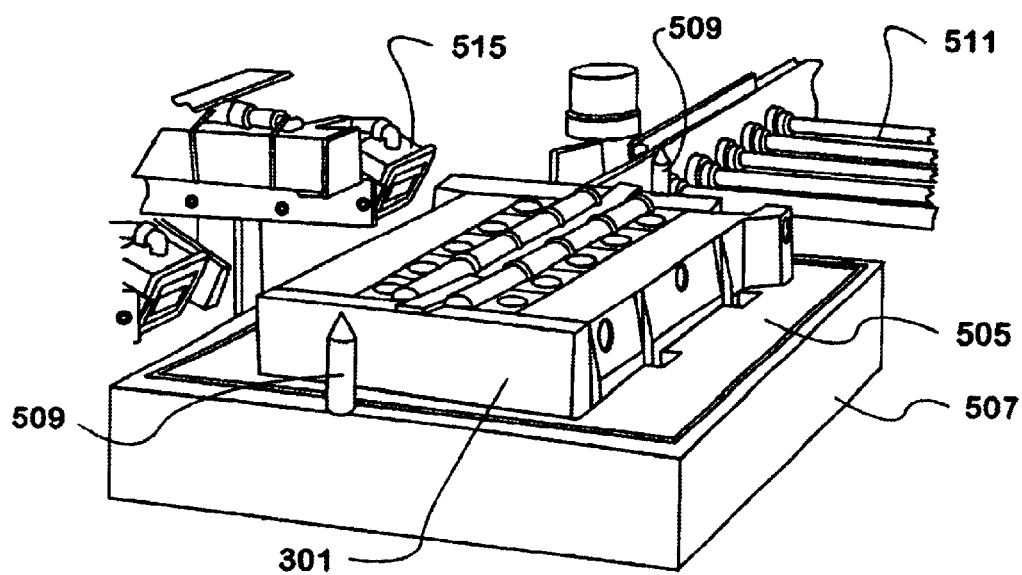
FIG. 8 is a perspective view of a core package disposed in a mold in accordance with the invention.

At step 215, the target location determined at step 213 is sent to the automated device 303, and this process waits until placement of the core package 301 is verified. At step 109, the automated device 303 receives the target location and places the core package 301 according to the target location, as shown in FIG. 8. The arms 305 separate away from the core package 301 in openings formed in the cavity for such a function, such that the separation of the arms 305 does not damage the mold 505. Receipt of target location may be utilized as a trigger to place the core package 301 or another signal may utilized as a trigger. The placement process may signal the mold process that placement is complete, the camera 309 or 515 may take an image, or another process may be utilized. At step 217, the mold 505 and core package 301 assembly is sent for further processing, including placing a cope on top of the mold 505 and core package 301 assembly, introducing molten metal into the mold, and the remainder of the casting process as known in the industry.

The present invention provides an automated method of accurately placing a core package in a mold. The mold need not have a fixed or precise orientation with respect to the flask in which it is disposed, i.e., the mold may float with respect to the flask. The flask need not have a fixed or precise orientation with respect to the system placing the core package. The core package may contain one or more pieces and may be very heavy, for example, in excess of 100 pounds. The present method may be utilized to locate any core without having to reprogram or retarget the automated devices. The core package may be placed in a mold having very close tolerances with respect to the outer periphery of the core package. The method is more accurate, more efficient, and faster than manual core placement. Alignment bushings are not utilized, thus replacement of worn bushings is not required.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising the steps of:
    lifting, by an automated device, a core package capable of at least partially fitting into a cavity in a mold;
    illuminating at least one area of the mold where one or more locators are expected to be located;
    obtaining at least one image of the at least one area of the mold;
    determining, from the at least one image, at least one differential location of at least one of the one or more locators with respect to a reference image;
    determining, from the at least one differential location, a target location for the cavity;
    placing, by the automated device, the core package according to the target location.

2. The method of claim 1, wherein the step of determining the differential location comprises the step of comparing the at least one image with at least one expected image.

3. The method of claim 1, further comprising the step of sending an instruction to the automated device to place the core package according to the target location.

4. The method of claim 1, further comprising the steps of moving the core package to an intermediate location and waiting at the intermediate location for information including the target location prior to the placing step.

5. The method of claim 1, further comprising the step of forming the one or more locators in the mold when the cavity is formed in the mold.

6. The method of claim 1, wherein at least one of the one or more locators is a recess formed in the mold, and wherein at least one of the one or more locators is positioned outside the cavity.

7. The method of claim 1, further comprising the step of forming the mold by compressing a pattern into green sand.

8. The method of claim 1, wherein the step of illuminating comprises illuminating by infrared light.

9. The method of claim 1, wherein the step of obtaining comprises utilizing at least one camera capable of obtaining an image by infrared light.

10. The method of claim 1, further comprising the step of disposing the mold in a flask and positioning the mold and flask such that the one or more locators are in close proximity to an illumination source that performs the illuminating step.

11. The method of claim 1, wherein the target location comprises an x-direction component, a y-direction component, and a rotational component.

12. The method of claim 1, wherein the core package is comprised of a plurality of pieces.

13. A method comprising the steps of:
    lifting, by an automated device, a core package capable of at least partially fitting into a cavity in a mold;
    illuminating a first area of the mold where a first locator is expected to be located;
    illuminating a second area of the mold where a second locator is expected to be located;
    obtaining a first image of the first area of the mold and a second image of the second area of the mold;
    comparing the first image and the second image with at least one expected image;
    determining, from the first image and the second image, a differential location of the first locator and the second locator with respect to a reference image;
    determining, from the differential location, a target location for the cavity;
    triggering the automated device to place the core package according to the target location;
    placing, by the automated device, the core package according to the target location.

14. The method of claim 13, further comprising the steps of moving the core package to an intermediate location and waiting at the intermediate location for information including the target location prior to the placing step.

15. The method of claim 13, further comprising the step of forming the first locator and the second locator in the mold when the cavity is formed in the mold.

16. The method of claim 13, wherein at least one of the first locator and the second locator is a recess formed in the mold, and wherein at least one of the first locator and the second locator is positioned outside the cavity.

17. The method of claim 13, further comprising the step of forming the mold by compressing a pattern into green sand.

18. The method of claim 13, wherein the step of illuminating comprises illuminating by infrared light.

19. The method of claim 13, wherein the step of obtaining comprises utilizing at least one camera capable of obtaining an image by infrared light.

20. The method of claim 13, further comprising the step of disposing the mold in a flask and positioning the mold and flask such that the first and the second locators are in close proximity to an illumination source that performs the illuminating step.

21. The method of claim 13, wherein the target location comprises an x-direction component, a y-direction component, and a rotational component.

22. The method of claim 13, wherein the core package is comprised of a plurality of pieces.

* * * * *